Feb. 20, 1945.　　　　P. E. MERCIER　　　　2,370,062
EXHAUST CONDUITS
Filed March 29, 1941
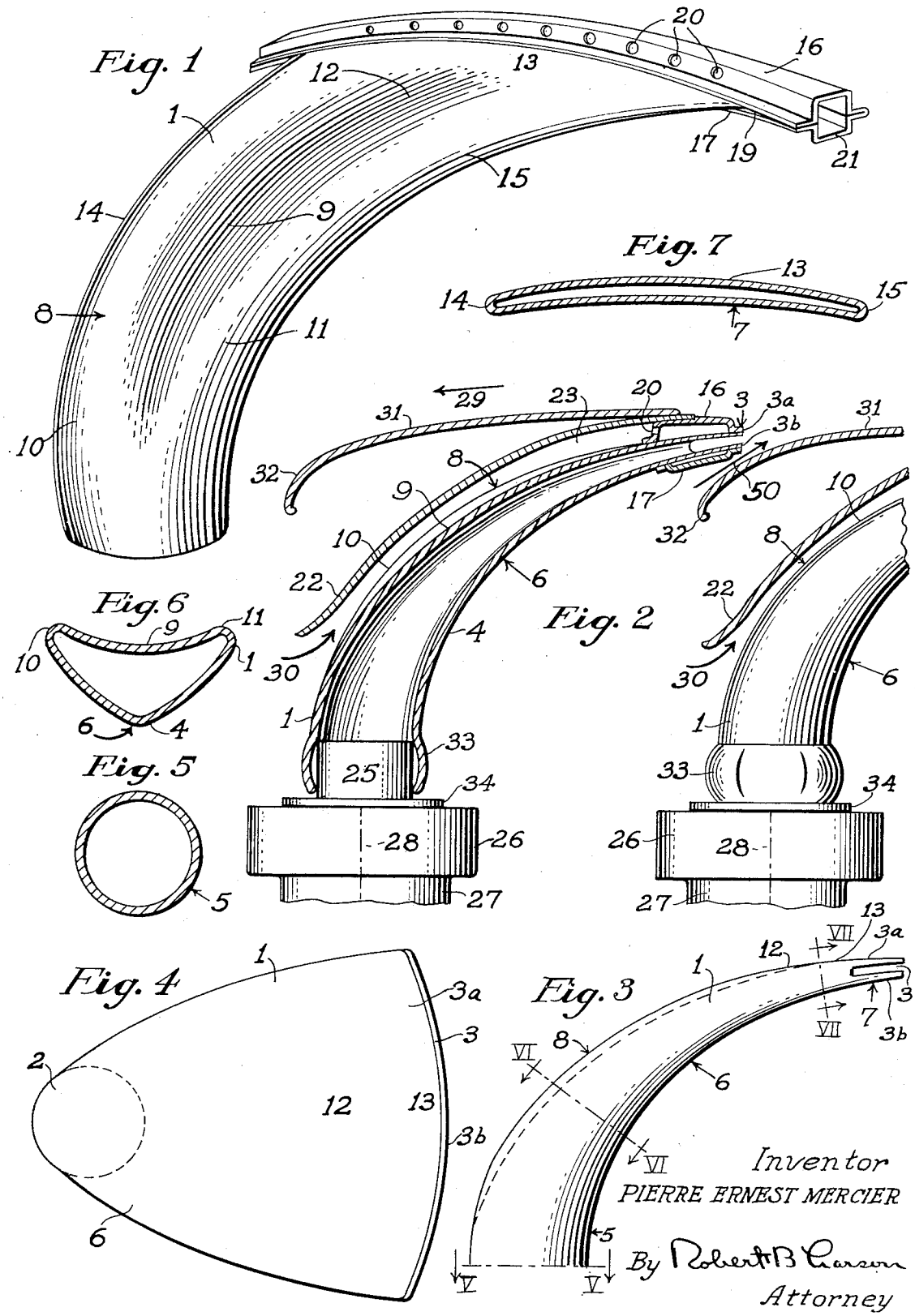
Inventor
PIERRE ERNEST MERCIER
By Robert B Carson
Attorney Patented Feb. 20, 1945

2,370,062

UNITED STATES PATENT OFFICE 2,370,062

EXHAUST CONDUIT

Pierre Ernest Mercier, New York, N. Y., assignor, by mesne assignments, to Helfeda, S. A., Geneva, Switzerland, a corporation of Switzerland Application March 29, 1941, Serial No. 385,842

12 Claims. (Cl. 60—29)

This invention relates to exhaust conduits of a new streamline type, especially as individually applied to each cylinder upon cylinder-in-line engines for aircraft provided with cooling systems.

The main object of my invention is to eliminate exhaust sparks, flashes and flames without damping or dissipating the kinetic energy remaining in the exhaust gases issuing from the engine cylinders.

Another object is to change the direction of the issuing exhaust gases and direct the same rearwardly to issue ultimately in the wake of the aircraft involved.

A further object is to cause the issuing exhaust gases to come into contact with the ambient atmosphere in the form of a thin stream along a predetermined plane by giving the exhaust conduit in each case a special shape effecting this result, and reinforcing the end to eliminate vibration.

It is also an object herein to produce the desired special form of the conduit by developing the straight sections thereof along a median line passing through the center of gravity of said straight sections, when said median line takes its origin at the level of the exhaust opening on each cylinder head and then generally follows a direction which is perpendicular to the alignment of the cylinders as well as to the line of flight of the aircraft, and finally curves toward the rear of said aircraft.

It is additionally an object to produce an exhaust conduit of the character indicated by arching the conduit to form a smooth curve from the inlet end toward the outlet while widening and gradually flattening the conduit toward said outlet, and depressing the exterior intermediate portion of the conduit to form a concave depressed section thereon along the median line upon the same.

Other objects and the advantages of my invention will be apparent from the following description when considered in conjunction with the accompanying drawing forming part hereof, in which Fig. 1 is a perspective view of an exhaust conduit made according to the present invention and embodying the salient features thereof;

Fig. 2 is a vertical central section through the same when in position upon a cylinder head and completely equipped with stringers and auxiliaries as in actual practice when used on an airplane;

Fig. 3 is a side elevation of the same with all auxiliaries stripped off to show the conduit alone;

Fig. 4 is a top plan view of the conduit similarly stripped of auxiliaries to disclose its varying width;

Fig. 5 is a transverse section of the conduit as taken on line V—V in Fig. 3;

Fig. 6 is another transverse section of the same as taken on line VI—VI in said Fig. 3;

Fig. 7 is a further transverse section of said conduit taken on line VII—VII in the same Fig. 3.

Throughout the views, the same references indicate the same or like parts.

On airplanes it is important to eliminate sparks, flashes and flames in the exhaust of the internal combustion engines driving the propellers, and it is essential to do this without damping the power of the engines or impeding the escape of the exhaust gases, but rather, to encourage the free escape of said gases. It is, of course, also desirable to use at least some of the heat of the exhaust gases for heating the carburetor and for other purposes. The invention now fulfills these purposes and forms a ready solution to all the problems involved.

Hence, in the practice of my invention, I prefer to make the individual conduit 1 of each cylinder on an airplane engine of metal and arcuate in form, as shown in Figs. 1, 2 and 3 and substantially round in section at the inlet end 2 as shown in Fig. 5, while causing the same to widen toward the outlet end 3 as particularly disclosed in Fig. 4. While the inner arched side 4 is convex through the greater portion of its length, being substantially round as indicated at 5 in Figs. 3 and 5 at the inlet end, and of convex form as indicated at 6 in Figs. 2, 3 and 6 intermediate the ends, while at the outlet end 3, the inner arcuate side is either straight or preferably slightly concave as indicated at 7 in Figs. 3 and 7. On the outer side generally indicated at 8, the round shape is also in evidence at the inlet end 2 as may be seen again in Fig. 5, but this changes into a slightly concave or depressed form 9 intermediate the sides 10, 11, which extends from a point above the inlet end up toward the outlet end. Near the latter the outer side flattens out at about the point indicated at 12 in Figs. 1, 3 and 4, after which it becomes convex in shape at 13, as shown particularly in Figs. 1 and 7.

The effect of the form described is to spread toward the sides the gases entering the inlet end of the exhaust conduit, as the depressed or concave portion 9 acts to a certain extent as a baffle in the interior of the duct which tends to direct the gases gently and smoothly toward the more spacious portions beneath 10 and 11. The two side edges 14 and 15 of this conduit diverge smoothly to a maximum width at the outlet end in cooperation with the mentioned intermediate depression to further encourage spreading of the flowing gases and bring the same into actual contact with the walls of the conduit and thus tend to quench flames, flashes and sparks issuing from the engine. If to this is added the feature of decreasing the section of the conduit and smoothly arching the same toward its outlet, the gases will flow so smoothly and spread so evenly that they issue as a thin sheet directly rearwardly of the airplane and merge into the wake thereof without causing any aerodynamic disturbances which might reduce the speed of flight of the airplane.

At the outlet end, the conduit preferably terminates in an arcuate edge so that the end is longest at the intermediate portion, virtually forming a pair of spaced lips 3a and 3b as shown in Figs. 2 and 4. Due to the relatively flat form of the outlet end 3 of the conduit, the lips 3a and 3b may be caused to vibrate by virtue of the pulsating effect of the exhaust gases during each exhaust period, it is found expedient to reinforce said lips by means of reinforcing channels or other members 16 and 17. These members are preferably channel members because they may also serve another purpose in addition to reinforcing the outlet parts 3a and 3b against vibration, as will be immediately explained. It is manifest that the conduit becomes quite hot in use, and it is therefore necessary to introduce an air cooling circulation, principally along the concave portion 9 upon the exterior of the conduit. This is accomplished by having the mentioned channel members 16 and 17 mounted opposite each other adjacent the ends of the lips upon the conduit, and also arranging a jacket 22 in spaced manner over the outer surface of said conduit. In order to provide a free passage for the cooling air to or from said channel members from or to the space between the jacket and the concave portion 9, a group of apertures 20 are made in one side of member 16, as shown in Figs. 1 and 2, while one end of jacket member 22 is secured to said member 16, the other end 24 being free so as to leave space 23 open at one end.

Both channel members are preferably joined beyond the sides of the conduit to form a single duct 21, which may be connected by means not shown to a heater in the fuselage, to a jacket about the carburetor, or arranged in any manner desired, in order to utilize the heat developed while at the same time cooling the conduit.

If the heated air from the space 23 can be sucked by the engine into the duct 21 through apertures 20, when using the air to heat the carburetor, the general circulation of the air will be obtained by the construction as shown in Fig. 2, the outflowing exhaust gases from outlet 3 tending to suck air past the end of baffle 31 as indicated by arrow 50.

Should it for some reason not be possible to produce a suction in duct 21 so as to draw in air in the direction of the arrow 30, it is possible to produce a pressure in said duct 21 in another way, or by means of an aerodynamic intake outside the airplane, when the general direction of flow of the cooling air will be reversed.

As the exhaust outlet 25 upon the cylinder head 26 of cylinder 27 to which the conduit is secured has the axis 28 thereof directed substantially perpendicularly to the direction or line of flight of the airplane indicated by the arrow 29, the air flowing past the plane will tend to cause air to enter said chamber 23 as indicated by arrow 30, which, however is more positively fed with air from the engine cooling system and will flow along portion 9 of the hot conduit and through apertures 20 into the channel members and duct, etc. A baffle or fairing 31 is also attached to the channel 16 with jacket 22 while being curved slightly toward its rear end at which it terminates in a more sharply curved portion 32. This baffle serves to ensure that the exhaust gases discharged from one conduit will pass the next and cause fresh air to partly enter each conduit jacket in the series upon the engine, which thus also serves to cool the conduit, and also the space between the conduits according to arrow 50 to insulate the conduit from the exhaust of the preceding conduit.

If it should not be desired to use the cooling air of the jackets of the exhaust conduits on the engine, air under pressure may, of course, be pumped through the channels 16 and 17 and ducts 21, which leaves the jackets at 30 and is discharged between the ducts or pipes.

The exhaust conduits are intended to be arranged behind each other and are preferably provided with the fairing means so arranged that a stream of air can flow between each conduit and the intermediate fairing which separates it from the following along arrow 50, as already mentioned, the exhaust gases being insulated from the outer surfaces of said members by a constantly renewed stream of air. In order to avoid the constraints of expansion and to facilitate assemblage, a ball joint may advantageously be inserted between the cylinder head and the exhaust conduit in accordance with the invention.

It is to be noted that according to the invention, a large amount of air is introduced between the pipes and a part of this air is sucked into space 30 of the jacket system, while the other part is evacuated along said arrow 50. It may be noted in passing that the temperature of this air is of course low in comparison with that of the exhaust conduits, and thus serves well as a flame damping means and to decrease the drag while increasing the efficiency due to the exhaust flow increasing the speed of movement of the air which is mixed near the outlet of each conduit.

A ball joint 33 (Fig. 2) may be used to secure the conduit in each case to the exhaust outlet 25, if desired, the latter being secured by flange 34 to the cylinder head 26, and these features merely constitute a convenience in the construction.

It is manifest that in this invention, the shape and relations of the parts may be modified within the scope of the appended claims.

Having now fully described my invention, I claim:

1. A cylinder-in-line internal combustion engine for aircraft having the exhaust outlets of the cylinders directed at an angle with respect to the line of flight and a series of distinct exhaust conduits connected individually to said exhaust outlets, each exhaust conduit being curved rearwardly from its inlet portion at the respectively adjacent cylinder head to the outlet portion of the conduit with said outlet portion terminating rearwardly with respect to said line of flight and each conduit having an entirely convex cross section at said inlet portion thereof widening progressively into a flattened form toward the rearwardly directed outlet portion of the same and at said outlet portion having its section of maximum width disposed substantially parallel to the flow of the air around the aircraft, each conduit gradually increasing in cross section from the inlet portion thereof and then slightly decreasing again up to the outlet portion of the same.

2. A cylinder-in-line internal combustion engine for aircraft having the exhaust outlets of the cylinders directed at an angle with respect to the line of flight and a series of distinct exhaust conduits connected individually to said exhaust outlets, each exhaust conduit being smoothly curved rearwardly from its inlet portion at the respectively adjacent cylinder head to the outlet portion of the conduit with said outlet portion terminating rearwardly with respect to said line of flight and each conduit having an entirely convex cross section at said inlet portion thereof widening progressively into a flattened form toward the rearwardly directed outlet portion of the same and at said outlet portion having its section of maximum width lying in a plane substantially coinciding with the line of flight.

3. A cylinder-in-line internal combustion engine for aircraft having the exhaust outlets of the cylinders directed at an angle with respect to the line of flight and a series of distinct exhaust conduits connected individually to said exhaust outlets, each exhaust conduit being curved rearwardly from its inlet portion at the respectively adjacent cylinder head to the outlet portion of the conduit with said outlet portion terminating rearwardly with respect to said line of flight and each conduit having an entirely convex cross section at said inlet portion thereof widening progressively into a flattened form toward the rearwardly directed outlet portion of the same and at said outlet portion having its section of maximum width disposed substantially parallel to the flow of the air around the aircraft, each conduit upon the exterior convexly arched surface thereof having a concave portion intermediate the side edges of said conduit extending substantially from the convex inlet portion toward the outlet portion of the conduit.

4. A cylinder-in-line internal combustion engine for aircraft having the exhaust outlets of the cylinders directed at an angle with respect to the line of flight and a series of distinct exhaust conduits connected individually to said exhaust outlets, each exhaust conduit being curved rearwardly from its inlet portion at the respectively adjacent cylinder head to the outlet portion of the conduit with said outlet portion terminating rearwardly with respect to said line of flight and each conduit having an entirely convex cross section at said inlet portion thereof widening progressively into a flattened form toward the rearwardly directed outlet portion of the same and at said outlet portion having its section of maximum width disposed substantially parallel to the flow of the air around the aircraft, each conduit upon the exterior convexly arched surface thereof having a concave portion intermediate the side edges of said conduit extending substantially from a point adjacent to the convex inlet portion toward the widened outlet portion of the conduit and progressively decreasing in depth toward said outlet portion.

5. A cylinder-in-line internal combustion engine for aircraft having the exhaust outlets of the cylinders directed at an angle with respect to the line of flight and a series of distinct exhaust conduits connected individually to said exhaust outlets, each exhaust conduit being curved rearwardly from its inlet portion at the respectively adjacent cylinder head to the outlet portion of the conduit with said outlet portion terminating rearwardly with respect to said line of flight and each conduit having an entirely convex cross section at said inlet portion thereof widening progressively into a flattened form toward the rearwardly directed outlet portion of the same and at said outlet portion having its section of maximum width disposed substantially parallel to the flow of the air around the aircraft, each conduit upon the exterior convexly arched surface thereof having a concave portion intermediate the side edges of said conduit extending substantially from a point adjacent to the convex inlet portion toward the widened outlet portion of the conduit and progressively decreasing in depth toward said outlet portion, and beyond the termination of said concave portion progressively flattening out and changing into an exteriorly convex portion at the outlet portion.

6. A cylinder-in-line internal combustion engine for aircraft having the exhaust outlets of the cylinders directed at an angle with respect to the line of flight and a series of distinct exhaust conduits connected individually to said exhaust outlets, each exhaust conduit being curved rearwardly from its inlet portion at the respectively adjacent cylinder head to the outlet portion of the conduit with said outlet portion terminating rearwardly with respect to said line of flight and each conduit having an entirely convex cross section at said inlet portion thereof widening progressively into a flattened form toward the rearwardly directed outlet portion of the same and at said outlet portion having its section of maximum width disposed substantially parallel to the flow of the air around the aircraft, each conduit terminating in a pair of substantially flat spaced lips of elongated and exteriorly curved form having their maximum extension at the intermediate portions thereof.

7. A cylinder-in-line internal combustion engine for aircraft having the exhaust outlets of the cylinders directed at an angle with respect to the line of flight and a series of distinct exhaust conduits connected individually to said exhaust outlets, each exhaust conduit being curved rearwardly from its inlet portion at the respectively adjacent cylinder head to the outlet portion of the conduit with said outlet portion terminating rearwardly with respect to said line of flight and each conduit having an entirely convex cross section at said inlet portion thereof widening progressively into a flattened form toward the rearwardly directed outlet portion of the same and at said outlet portion having its section of maximum width disposed substantially parallel to the flow of the air around the aircraft, each conduit terminating in a pair of slightly arched spaced lips of elongated and exteriorly curved form having their maximum extension at the intermediate portions thereof.

8. A cylinder-in-line internal combustion engine for aircraft having the exhaust outlets of the cylinders directed at an angle with respect to the line of flight and a series of distinct exhaust conduits connected individually to said exhaust outlets, each exhaust conduit being curved rearwardly from its inlet portion at the respectively adjacent cylinder head to the outlet portion of the conduit with said outlet portion terminating rearwardly with respect to said line of flight and each conduit having an entirely convex cross section at said inlet portion thereof widening progressively into a flattened form toward the rearwardly directed outlet portion of the same and at said outlet portion having its section of maximum width disposed substantially parallel to the flow of the air around the aircraft, each conduit terminating in a pair of spaced elongated lips each having an exteriorly mounted channel member upon the same with one side of the same perforated to allow passage of air therethrough, and including means for introducing air into said channel members through the perforations and for conducting the air from the ends of said channel members for use on the aircraft.

9. A cylinder-in-line internal combustion engine for aircraft having the exhaust outlets of the cylinders directed at an angle with respect to the line of flight and a series of distinct exhaust conduits connected individually to said exhaust outlets, each exhaust conduit being curved rearwardly from its inlet portion at the respectively adjacent cylinder head to the outlet portion of the conduit with said outlet portion terminating rearwardly with respect to said line of flight and each conduit having an entirely convex cross section at said inlet portion thereof widening progressively into a flattened form toward the rearwardly directed outlet portion of the same and at said outlet portion having its section of maximum width disposed substantially parallel to the flow of the air around the aircraft, each conduit terminating in a pair of spaced elongated lips each having an exteriorly mounted channel member upon the same with one side of the same perforated to allow passage of air therethrough, and including means for introducing air into said channel members through the perforations thereof including a guide wall member attached to at least one of the channel members and extending a distance toward the inlet portion of the conduit in spaced relation along the exterior surface thereof.

10. A cylinder-in-line internal combustion engine for aircraft having the exhaust outlets of the cylinders directed at an angle with respect to the line of flight and a series of distinct exhaust conduits connected individually to said exhaust outlets, each exhaust conduit being curved rearwardly from its inlet portion at the respectively adjacent cylinder head to the outlet portion of the conduit with said outlet portion terminating rearwardly with respect to said line of flight and each conduit having an entirely convex cross section at said inlet portion thereof widening progressively into a flattened form toward the rearwardly directed outlet portion of the same and at said outlet portion having its section of maximum width disposed substantially parallel to the flow of the air around the aircraft, each conduit terminating in a pair of spaced elongated lips each having an exteriorly mounted channel member upon the same with one side of the same perforated to allow passage of air therethrough, and including means for introducing air into said channel members through the perforations thereof including a guide wall member attached to at least one of the channel members and extending a distance toward the inlet portion of the conduit in spaced relation along the exterior surface thereof, and also a baffle member attached at one end to said guide wall member adjacent to channel member involved and extending exteriorly of the guide wall member at a gradually increasing distance therefrom so as to guide the exhaust gases of the preceding exhaust conduit in the series outwardly away from the guide wall members in said series and allow fresh air to enter the spaces between the latter and the respective conduits with which they are associated.

11. A cylinder-in-line internal combustion engine for aircraft having the exhaust outlets of the cylinders directed at an angle with respect to the line of flight and a series of distinct exhaust conduits connected individually to said exhaust outlets, each exhaust conduit being curved rearwardly from its inlet portion at the respectively adjacent cylinder head to the outlet portion of the conduit with said outlet portion terminating rearwardly with respect to said line of flight and each conduit having an entirely convex cross section at said inlet portion thereof widening progressively into a flattened form toward the rearwardly directed outlet portion of the same and at said outlet portion having its section of maximum width disposed substantially parallel to the flow of the air around the aircraft, each conduit terminating in a pair of spaced lips having a jacket and suitably grooved stringers mounted upon the same in positions to be effective to serve as conduits for an air circuit arranged between the walls of said conduit and said jacket so as to form a double casing.

12. A cylinder-in-line internal combustion engine for aircraft having the exhaust outlets of the cylinders directed at an angle with respect to the line of flight and a series of distinct exhaust conduits connected individually to said exhaust outlets, each exhaust conduit being curved rearwardly from its inlet portion at the respectively adjacent cylinder head to the outlet portion of the conduit with said outlet portion terminating rearwardly with respect to said line of flight and each conduit having an entirely convex cross section at said inlet portion thereof widening progressively into a flattened form toward the rearwardly directed outlet portion of the same and at said outlet portion having its section of maximum width disposed substantially parallel to the flow of the air around the aircraft, each conduit terminating in a pair of spaced elongated lips each having an exteriorly mounted reinforcement member fixed upon the same to eliminate vibration during operation of the engine.

PIERRE ERNEST MERCIER.